May 23, 1961  W. A. BAKER  2,985,201
APPARATUS AND METHOD FOR THE DEGASIFICATION AND/OR
DEHYDRATION OF MASSES OF COMMINUTED PARTICLES
SUCH AS POWDERS OR DUSTS
Filed May 27, 1958  4 Sheets-Sheet 1

INVENTOR
WARREN A. BAKER
ATTORNEYS

May 23, 1961 W. A. BAKER 2,985,201
APPARATUS AND METHOD FOR THE DEGASIFICATION AND/OR
DEHYDRATION OF MASSES OF COMMINUTED PARTICLES
SUCH AS POWDERS OR DUSTS
Filed May 27, 1958 4 Sheets-Sheet 2
*Fig. 9*
*Fig. 2*
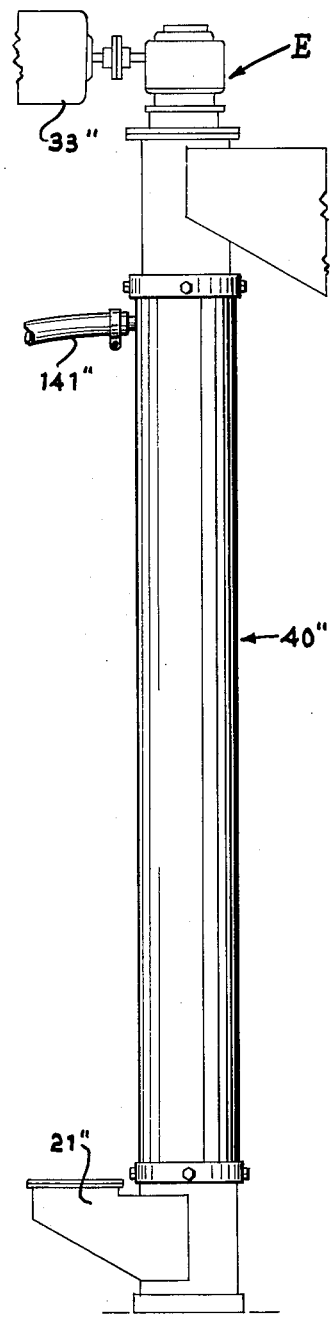
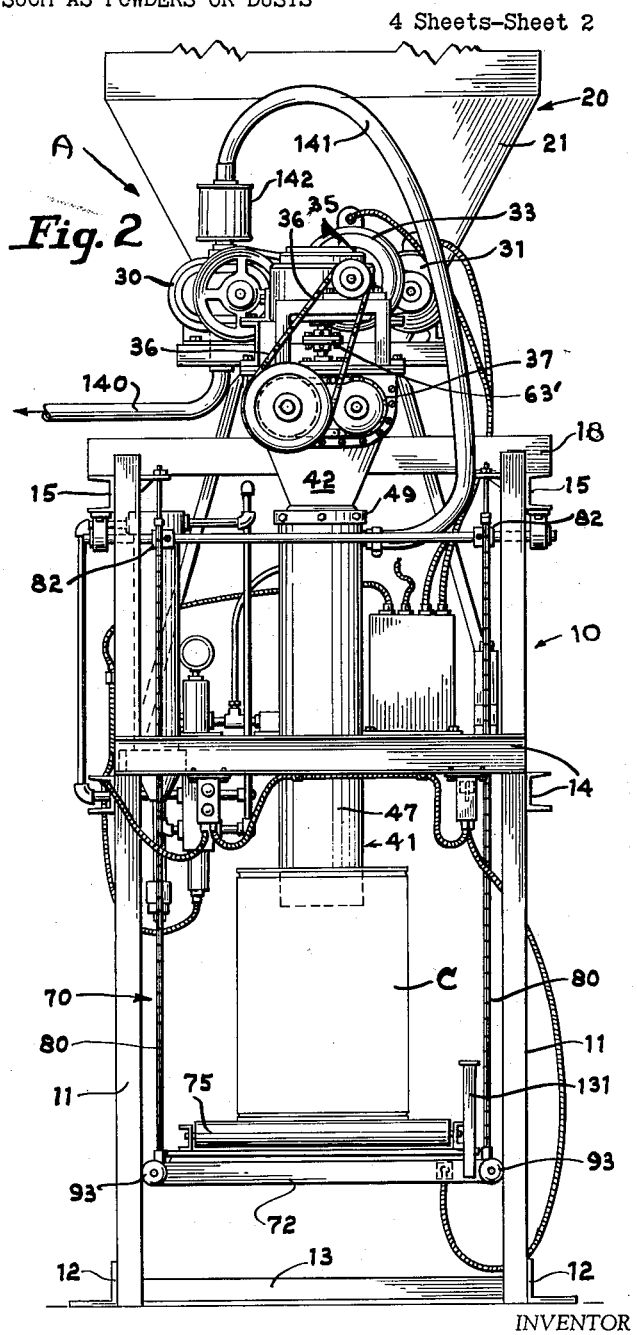
INVENTOR
WARREN A. BAKER
BY
ATTORNEYS May 23, 1961  W. A. BAKER  2,985,201
APPARATUS AND METHOD FOR THE DEGASIFICATION AND/OR
DEHYDRATION OF MASSES OF COMMINUTED PARTICLES
SUCH AS POWDERS OR DUSTS
Filed May 27, 1958  4 Sheets-Sheet 3
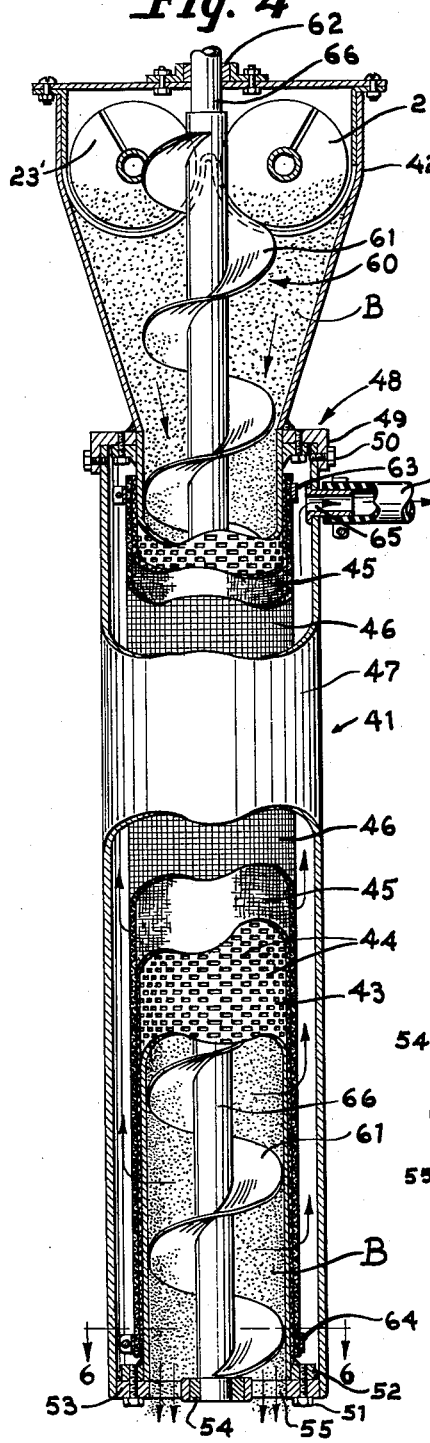
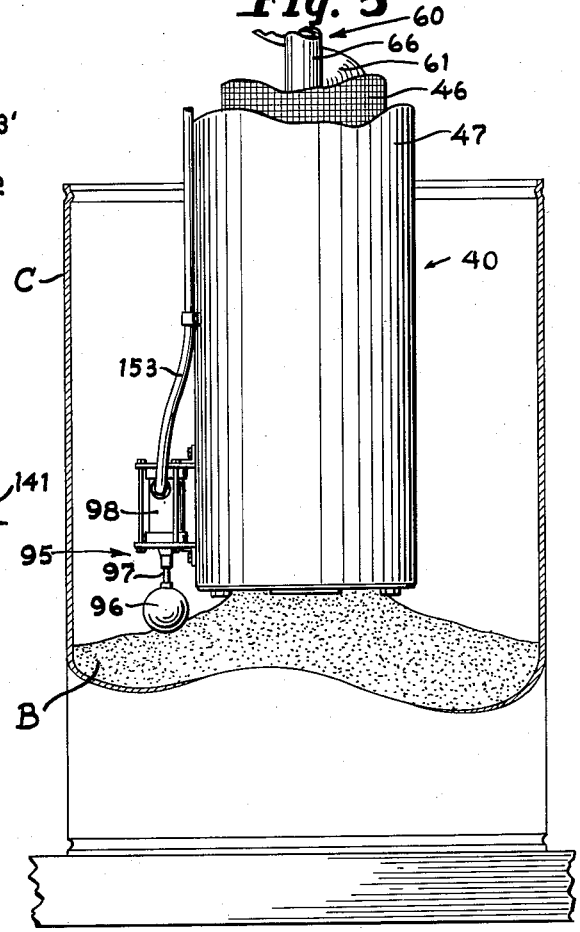
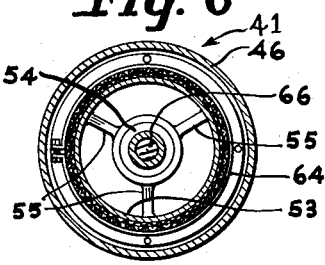
INVENTOR
WARREN A. BAKER
BY
ATTORNEYS

INVENTOR
WARREN A. BAKER
BY
ATTORNEYS

United States Patent Office 2,985,201
Patented May 23, 1961

2,985,201

APPARATUS AND METHOD FOR THE DEGASIFICATION AND/OR DEHYDRATION OF MASSES OF COMMINUTED PARTICLES SUCH AS POWDERS OR DUSTS

Warren A. Baker, Clarksdale, Miss., assignor to Coahoma Chemical Co., Inc., Clarksdale, Miss., a corporation of Mississippi Filed May 27, 1958, Ser. No. 738,234

5 Claims. (Cl. 141—12)

This invention relates to apparatus and methods for processing materials for their deaeration, degasification or dehydration and the packaging of such processed materials. The materials may be, for example, comminuted materials as finely ground powders and dusts.

When some materials are comminuted, it has been found that they entrain a relatively large volume of air or even moisture, which prevents commercial packaging of the comminuted materials in a rapid manner and in minimum-size receptacles or containers. In some cases, the comminuted materials are found to bulk three times that of the same un-comminuted materials when introduced into receptacles or containers.

An important object of the invention is to provide apparatus and a method for the vacuum removal of gases, as air, or moisture from comminuted materials before actual introduction of the materials to containers. This is in contradistinction to apparatus and methods which are adapted to remove gases, as air or moisture, from materials after being introduced into the containers.

Another important object is to provide apparatus for removing gases or moisture from masses of comminuted materials, of substantially incompressible particles, before introduction into containers, without causing the material to pack in the apparatus before it reaches the containers. Such packing seriously interferes with vacuum removal of gases and moisture.

A further important object is to provide apparatus as described in the last-above paragraph which is so constructed and arranged that gases or moisture, exteriorly of a container, will not be apt to flow to the degasified or dehydrated materials during introduction of the material into the containers.

Furthermore, an important object of the invention is to provide apparatus which includes vacuum means for the removal of undesired entrained products from the material to be packaged, which means includes a foraminous tubular wall portion and means to progressively wipe the material, which is drawn by the vacuum to this wall and would adhere thereto, from this wall so that the material will not clog the openings in the wall. The last-named means also provides a spiral path for the flow of the material while being rid of the undesired products so that the lengthy path traversed will permit removal of substantially all the entrained undesired products.

Another important object is to provide vacuum means for the removal of entrained undesired products as air, other gases and moisture from material, of incompressible particles, just prior to packaging, whether the path of the material during removal of the undesired products be in a spiral downward path, a spiral upward path, a spiral horizontal path or a path inclined from the vertical and horizontal.

Other objects and advantages of the invention will be apparent during the course of the following detailed description of the invention, taken in connection with the accompanying drawings, forming portions of this disclosure, and in which drawings:

Figure 2 is an end elevational view (from the right-hand end of Figure 1) of the apparatus and receptacle of Figure 1.

Figure 4 is a view mostly in section of the basic unit or separating and discharge means of the apparatus on a scale larger than in Figures 1–3.

Figure 5 is a fragmentary elevation of the lower portion of the basic unit of Figure 4 with a receptacle, in process of being filled, partly in vertical section.

Figure 6 is a horizontal sectional view, substantially on the line 6—6 of Figure 4.

Figure 9 is a fragmentary elevation showing the basic unit of Figure 4 wherein the treated material is elevated instead of descending, as in the apparatus of Figures 1–6 inclusive.

Figure 1:
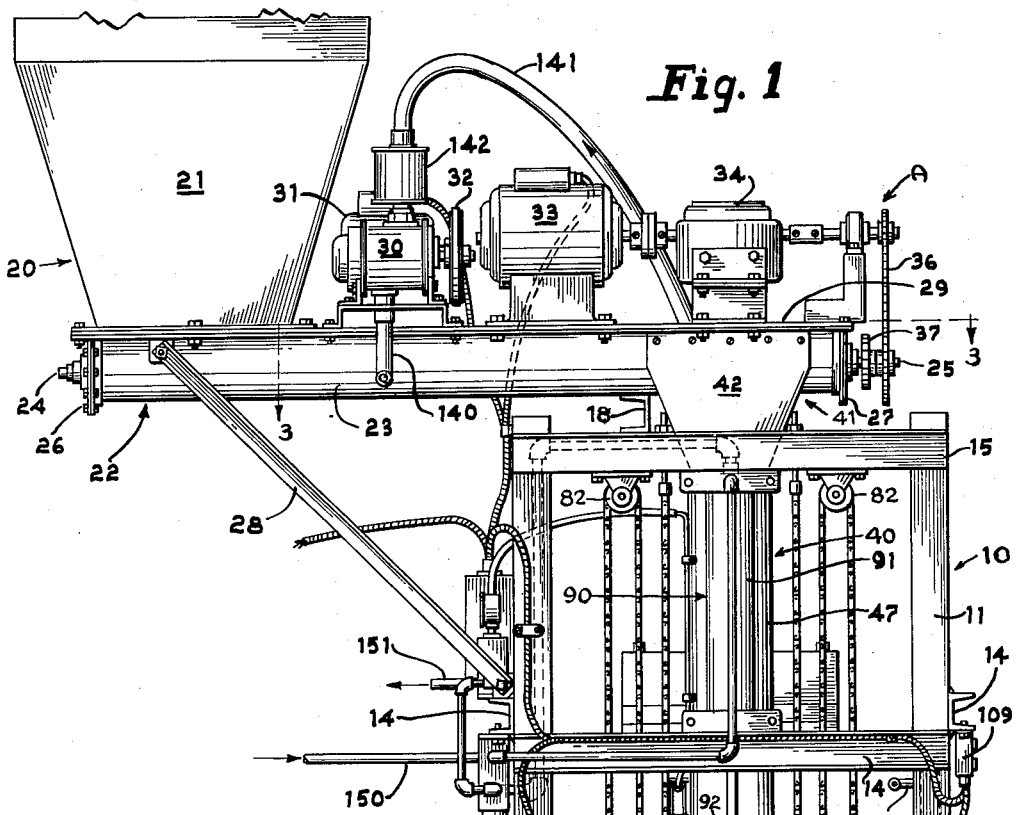
Figure 1 is a side elevational view of the apparatus with a receptacle being filled thereby and the positions of the receptacle and elements of the apparatus being such as when the receptacle is nearly full.

In the drawings, wherein for the purpose of illustration is shown a preferred embodiment of the invention and two adaptations of the basic unit thereof to horizontal use and as an elevator, the letter A designates the preferred embodiment; the letter B a comminuted materials mass, of substantially incompressible particles, as powdery and dust particles, being treated; C, a receptacle for the treated material; D, apparatus with the basic unit of the preferred embodiment arranged horizontally; and E, apparatus with the basic unit of the preferred embodiment arranged for elevation of the material.

The apparatus A includes a support or frame 10 which may comprise uprights or corner posts 11 connected, as by welding, to cross members, as the lower cross members 12 and 13, intermediate cross members 14 and upper cross members 15, which latter may be welded to a substantially horizontally-disposed frame member 16 consisting of a plurality of cross members 17. The uprights or corner posts may be of hollow construction, rectangular in horizontal section. The lower cross members 12 preferably extend outwardly beyond the vertical plane of the rest of the support or frame 10 in order to provide feet to prevent tipping of the latter and may be of angle-iron construction, while the cross members 14 and 15 may be channel-irons.

Carried by the support or frame 10, such as above the frame member 16, is conventional hopper means 20 which provides a housing 21 having a downwardly-opening discharge into a conventional conveyor means 22, which provides a conveyor housing 23 opening to the hopper at, of course, adjacent one end portion thereof, with the conveyor housing being disposed, with its longitudinal axis substantially horizontal. The housing 23 preferably contains a pair of parallel conventional screws 23' and the housing has a downwardly-opening discharge at its end portion opposite the first-named end portion, with the end portions of shafts 24 and 25 of the screws 23' rotatably extending through the end walls 26 and 27 of the housing 23.

The housing 23 may be carried by the cross member 18 and by braces 28 extending diagonally from the hopper end portion of the housing to the adjacent cross member 14.

Carried by the upper portion of the housing 23 is an elongated horizontal platform 29 adapted to support certain portions of the apparatus, such as the hopper housing 21 which may be bolted thereto. This platform 29 is also adapted to support a motor, as the conventional electric motor 31 and a pump, such as a conventional rotary vacuum pump 30 with the rotors thereof operatively connected together as by the belt 32. A second motor, as the conventional electric motor 33, is also mounted (as by being bolted thereto) upon the platform and its rotor is operatively connected with the reduction gears of a conventional speed reducer 34 with the reduced speed output of the latter operatively connected with the shafts 25 of the conveyor means 22 by way of the sprocket 35 and chains 36 and 37. The speed reducer 34 may be bolted upon the platform 29.

Referring now to the novel means 40 for separating and removing undesired products from the material to be introduced, after separation from it of undesirables, into containers, the same may be termed the basic unit since it has application under various conditions, some of which will be described and illustrated. The basic unit or means 40 includes the material intake means 41 which, in one example, is illustrated particularly in Figures 1 and 4, and comprises the receptacle or housing 42 into which the material B from the conveyor means 22 is discharged and which housing 42 may be bolted to depend from the platform 29. The downwardly converging walls of the housing 42 extend to and merge into the wall of a tubular (circular in transverse section, as shown in Figure 6) lower wall portion 43, the greater extent of which is foraminous, since it is provided with a plurality of spaced-apart small openings or foramina 44, preferably in the form of minute slots. The wall portion 43 defines a chamber. Surrounding the wall portion 43 and in intimate contact therewith is a sleeve or tubular portion 45 of fabric, which is preferably a heavy grade of unbleached muslin with a permeability of approximately 10 cubic feet of air per minute. A substitute may be a fabric of Orlon (an acrylic synthetic fiber of E. I. duPont de Nemours & Co., Inc., Wilmington, Delaware) with substantially the same permeability as noted for the muslin. In intimate contact with the outer surface of the sleeve or tubular portion 45 is a second sleeve or tubular portion 46 of foraminous material, such as wire mesh, preferably of aluminum wire, with preferably about 14 openings to the inch.

Spaced outwardly from the sleeve or tubular portion 46 is a tubular housing 47 of air-tight metal, which is bolted at one end portion thereof in air-tight relationship to the wall portion 43 at a non-foraminous end part thereof, by means of a double-walled flange structure 48 extending from the wall portion 43 and provided with a skirt 49 embracing the end portion of the tubular housing and through which bolt shanks 50 extend and into the tubular housing 47. The opposite end of the tubular housing is secured, as by bolts 51, to an outwardly-extending flange 52, at the free end of the wall portion 43, and a spider structure 53 is secured at this opposite end of the tubular housing. The open center ring of the spider structure contains a bearing 54 for the free end of a shaft of a major screw conveyor 60 to be next described. The openings between the arms of the spider structure are the discharge ports 55. It will be noted, particularly in Figure 6, that the ports are individually large, with very little of the spider barring the discharge of the material. This tends to prevent packing of the material, which packing is undesirable for various reasons, including a surge in the material when a packing at a discharge port is broken by a vacuum or intermittent filling of a receptacle or container caused by packing at a discharge port, or the mere packing of the material which would be apt to discharge in adherent masses of particles. The arms of the spider are slender and the openings 55 between adjacent arms are large in proportion to the area of an adjacent arm, yet the vacuum created will prevent a too rapid discharge from the openings and consequent too rapid flow of the material B through the chamber of the tubular lower wall portion 43.

The major screw conveyor 60 is of spiral form, preferably as shown in Figure 4, comprising a central shaft 66 and blade structure 61 secured thereto, with one portion of the shaft journaled in a suitable bearing 62 from which the shaft 66 projects and is operatively connected for rotation by the reduction gears of the speed reducer 34, by way of the coupling 63'.

In Figure 4 it will be noted that the several sleeves 45 and 46 about the tubular lower wall portion 43 may be secured thereto by bands 63 and 64.

The blades of the blade structure 61 do not compress the material B, but, instead, effect a wiping or cleaning action on the inner face of the tubular lower wall portion 43, as they convey the material toward the discharge ports 55.

At the end part of the tubular housing 47 nearest the housing 42 is a discharge opening 65 in the wall of the former through which the undesired products of the material B are drawn by vacuum, as will be explained later.

Elevator means 70, for the selective reciprocation of a container or receptacle C, into which the material B, freed of undesired products, is introduced, is shown as including a combined elevator-scales platform 71 comprising a rigid horizontally-disposed support housing 72 with a vertically-movable scales platform 73 movably supported thereby, and a conventional roller conveyor structure 74 mounted upon the platform 73 with the series of axially parallel rollers 75 adapted to support a receptacle C.

Supporting the structure 72, 73 and 74 are a plurality (as four) of sprocket chains 80 with their lower end portions secured to the support housing 72, as the corner portions thereof, by appropriate coupling means 81. The chains 80 are trained over sprocket wheels 82 rotatably carried by the cross members 15 and then extend downwardly therefrom to train about sprocket wheels 83 rotatably carried by a vertically-reciprocating, horizontally-disposed frame member 84. Of course, the frame member 84 is disposed below and spaced from the cross member 15 and above and spaced from the structure 71, substantially as shown in Figure 1.

Supported, as from one of the cross members 15, is operating means 90 for the elevator means 70. This may be a conventional pneumatically-operated piston enclosed in a vertically-disposed cylinder housing 91 with the piston rod 92 secured at its outer end to the frame member 84. Reciprocatory movements of the piston and rod will raise or lower the frame member 84 and consequent lowering or raising of the structure 71 to 75 inclusive and, of course, a receptacle C carried thereby.

In order to effect steady raising and lowering of the structure just mentioned above, it is desirable to provide rollers 93 rotatably carried by the housing 72 with their peripheries contacting the outer faces of the corner posts 11.

Feeler means 95, shown more particularly in Figures 5 and 7, for keeping the general level of the material B within the receptacle C slightly below the horizontal plane of the discharge ports 55, may include a light-weight sphere 96 carried by an oscillating support or rod 97 and which latter is operatively connected with a conventional pressure-sensitive air-relief valve 98.

Figure 7:
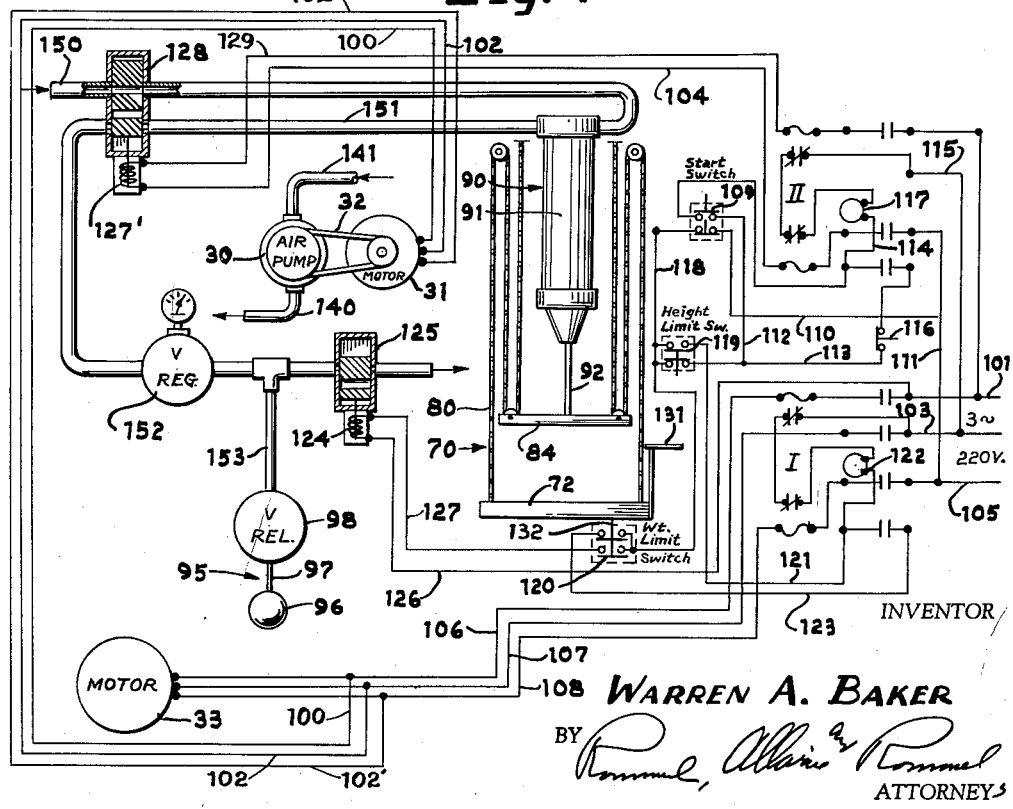
Figure 7 is an electrical wiring and pneumatic system diagram of the apparatus.

Referring now more particularly to Figures 1 and 7, the electric motor 30, which operates the pump 31 by way of belt 32, is electrically connected through lead 100 to lead 106, through lead 102 to lead 107 and through lead 102' to lead 108. Motor 33 is electrically connected by leads 106, 107 and 108 to the power line conductors 101, 103 and 105 respectively. An electric start switch 109 is electrically connected by one contact with the conductor 105 by leads 110 and 111, and by a contact with conductor 103 by way of leads 112, 113, 114 and 115 with a conventional interlock electric switch 116 mounted upon a conventional magnetic holding coil switch 122 interposed in the lead 113, and a conventional magnetic holding coil switch 117 interposed in the lead 114. The third contact of the switch 109 is electrically connected with the lead 114 and the fourth contact with lead 118 to feed to two contacts of a height limit switch 119 and also to two contacts of a weight limit switch 120. The third contact of the switch 119 is electrically connected with lead 113 and the fourth contact electrically connected by way of lead 121 to conductor 103 with a second conventional magnetic holding coil switch 122 interposed in lead 121. The third contact of the weight limit switch 120 is electrically connected with a lead 123 with the magnetic holding switch coil 122, and the fourth contact by lead 127 connected with one end of the windings 124 of a solenoid-operated valve 125, with the other end of the windings electrically connected by lead 126 with conductor 101. A second solenoid-operated valve 128 has one end of the windings 127' of the switch electrically connected with the lead 100 by lead 129, while the other end of the windings is electrically connected with the lead 104.

The operating handle 130 of the height-limiting switch 119 is interposed in the path of a switch handle actuator 131 extending upwardly from the support housing 72, which, upon rising a predetermined distance, will trip the handle 130 but when the actuator 131 moves downwardly out of contact with the handle 130 the latter will take its position as in Figure 1.

The free end of the switch handle 132 of the weight-limit switch 120 contacts the bottom of the scales platform 73 for actuation of the handle upon depression of the platform 73 when the receptacle C is filled to a predetermined limit, and also when the receptacle is removed and the platform rises.

Now referring to the system of valves and conduits operatively connected therewith, it will be seen in Figure 7 that the vacuum pump 30 has an air discharge conduit 140 and an intake conduit 141 with a filter 142 interposed between the pump body and the intake 141, which filter receives the undesired products removed from the material B. The intake conduit 141 leads to the discharge opening 65 whereby, upon operation of the pump 31, a vacuum will be created in the tubular housing 47 and, of course, in the tubular lower wall portion 43, for the purpose of drawing the undesired products from the material B through the openings 44 in the tubular lower wall portion 43 and the openings in the sleeve portions 45 and 46, but the balance of the material B will move along the blade structure 61 and emerge through the discharge ports 55. Some of the material will tend to collect on the inner face of the tubular lower wall portion 43 to be wiped or scraped off by the blade structure 61. Packing of the material in the foramina 44 is eliminated by their slot shape as distinguished from mere circular perforations as the blades sweep across the slot-like foramina from end to end.

Still referring mainly to Figure 7, from a conventional source (not shown) of pressure fluid, as air under pressure, the fluid is admitted to conduit 150 and flows to the interior of the upper end portion of the cylindrical housing 91 of the operating means 90. As is common in the art, this end is above the piston with the piston rod 92 extending downwardly therefrom and through and outwardly of the bottom of the cylindrical housing 91. From the opposite side of the upper end portion of the cylinder, substantially 180° from the conduit 150, is a second conduit 151 opening into the cylinder to receive the discharge of pressure fluid therefrom. Interposed in the conduits 150 and 151 is the solenoid-operated four-port valve 128 which will, in one position of the valve element, open the conduit 150 (as in Figure 7) and close the conduit 151 and, in the other position, close conduit 150 and open conduit 151. Interposed in the conduit 151 is also a regulating valve 152 and the solenoid-operated valve 125 adapted to selectively open or close the conduit 151 upon electrical actuation of the armature of the same. The conduit 151 is a pressure fluid relief conduit beyond the valve 125. Opening into the conduit 151 is a conduit 153 which extends to the relief valve 98.

It is thought that operation of the electrical and pneumatic systems has been explained, however it should be noted that the material B moves from the hopper housing 21 directly through the closed conveyor housing 23 and then directly through the receptacle 42 and into the imperforate walled housing 42 from whence it moves into the tubular lower wall portion 43 to begin degasification or dehydration. From Figure 4 it will be seen that the upper end portion of the blade structure 61 extends to above the axial centers of the screws 23' so that the material B does not tend to drop suddenly and tend to pack. Because of the vacuum existing, the material tends to move along the blade structure 61. Material would tend to pack excessively on the inner face of the tubular lower wall portion 43 and impede to an undesired degree the movement of the undesired products were it not for the wiping action of the blades.

It should be noted that when switch 109 is closed, the coil of the magnetic holding coil switch 117 is energized and pressure fluid is admitted, upon movement of the valve 128 to the position in Figure 7, to cylinder 91 which will force the piston and its rod 92 downwardly for raising the structure 72, 73 and 74, with the receptacle C positioned thereon. When the actuator 131 contacts and moves the handle 130 and the latter opens the switch 119, de-energizing the solenoid of valve 128 and closing the conduit 150, bleeding of pressure fluid from the cylinder 91 by way of valve 152 and 98. The drive motor 33 is now energized. Of course, when the receptacle reaches a predetermined filled weight, the scale platform will be depressed and activate the switch 132, whereupon the drive motor 33 stops. Valve 125 will thereupon open to permit final bleeding of pressure fluid from the cylinder 91 and lowering of the platform and receptacle.

Figure 8:
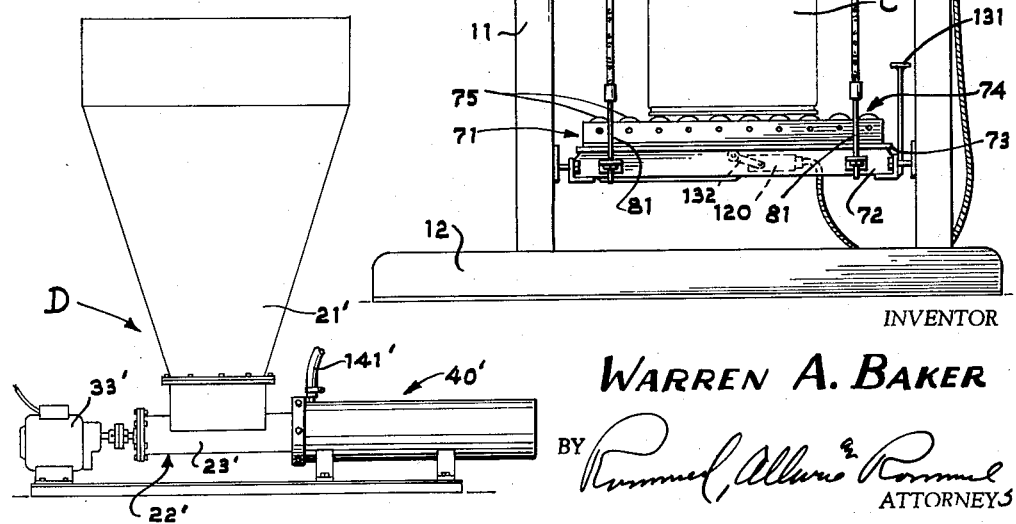
Figure 8 is a fragmentary elevation illustrating the basic unit of Figure 4 disposed horizontally.
Figure 3:
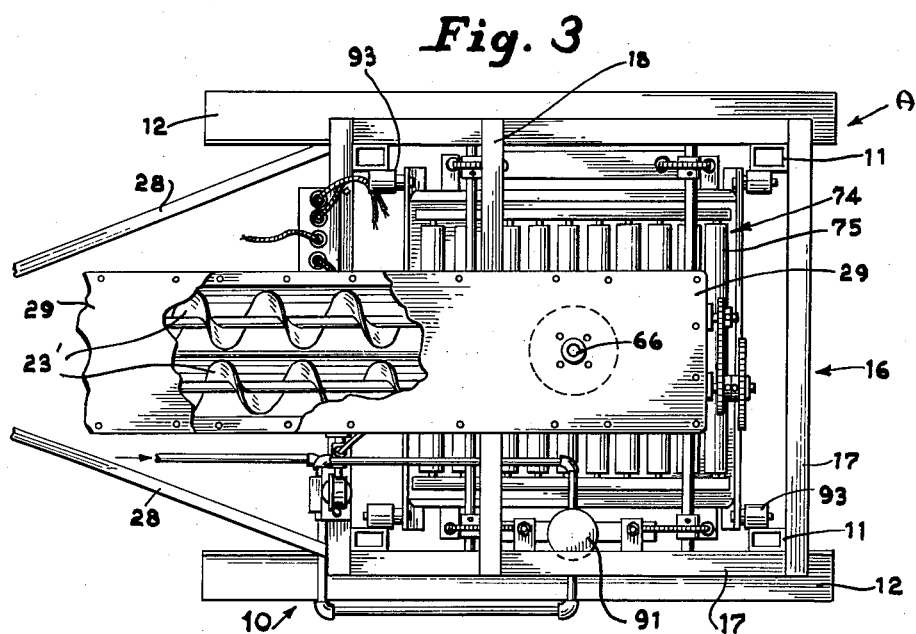
Figure 3 is a fragmentary horizontal sectional view of the apparatus substantially on the line 3—3 of Figure 1, with portions broken away in order to reveal parts of the structure below.

In Figure 8, illustrating the apparatus D, the means 40' or basic unit, substantially like the means 40, is disposed substantially horizontally with an associated conveyor means 22', substantially like the means 22 and rotated by the motor 33' with the material being fed from the hopper 21' into the housing 23' of the means 22'. The conduit 141' functions as does the conduit 141. The structure provides an air lock.

Figure 9 illustrates the apparatus E with the means 40" or basic unit, substantially like the means 40, arranged vertically but adapted to elevate the material from a hopper 21" for discharge at the upper end of the means 40". The conduit 141" function as does the conduits 141 and 141' and the motor 33" operates as does the motor 33, insofar as the blade structure of the means 40" is concerned.

Various changes may be made to the forms of the invention herein shown and described without departing from the spirit of the invention or scope of the claims.

What is claimed is:

1. Apparatus for separating entrained air and moisture from a comminuted materials mass of substantially incompressible particles, including a foraminous tubular wall portion defining a chamber, dual-function means carried by said tubular wall portion for moving said materials mass along a spiral path in said chamber and for wiping, at the same time, comminuted materials of said mass from the inner periphery of said tubular wall portions; a sleeve of air-pervious material about and in intimate contact with the outer periphery of said tubular wall portion and a sleeve of metallic mesh about and in intimate contact with the outer periphery of the first-named sleeve; means extending about the second sleeve for securing said sleeves to said tubular wall portion; vacuum means for creating a vacuum within said materials mass in said chamber and in the foramina of said tubular wall portion and the interstices of said sleeves; and discharge means carried by said tubular wall portion for the discharge of said materials mass, substantially freed of said air and moisture, from said chamber.

2. Apparatus for separating entrained air and moisture from a comminuted material mass of substantially incompressible particles, including first conveyor means for moving said material mass in spiral paths, said means including a pair of axially parallel conveyor screws having shafts and blades carried thereby; a material mass intake receptacle in communication with said first conveyor means, a foraminous tubular wall portion in communication with said receptacle and defining a chamber for receiving the material mass from said material mass intake receptacle, said foraminous tubular wall portion having a discharge mouth; second conveyor means within said chamber and receptacle, comprising a screw conveyor for moving said material mass to said discharge mouth and having a shaft and conveyor blades carried by said shaft, with one end portion of the second-named shaft extending between the shafts of said first conveyor means and the blades carried by said one end portion being closely adjacent the blades at one end portion of each of the first-named shafts; and pneumatic means for removing air and moisture from said material mass within said chamber and through the foramina of said foraminous tubular wall portion.

3. In combination with apparatus for separating entrained undesired products comprising air and moisture from a mass of flowable minute particles of substantially incompressible material and introducing the undesired products-free mass into an upwardly-opening container, said apparatus including an upwardly-extending tubular wall portion for receiving said mass and provided with a downwardly-opening discharge port at the lower end part thereof, means for moving said mass through said tubular wall portion to said discharge port, and means for removing said undesired products from said mass while said mass is within said tubular wall portion; elevator means for positioning a container wtih said one end part of said tubular wall portion within said container and spaced closely above the bottom thereof and for moving said container vertically whereby the bottom thereof moves away from said discharge port; and means carried partly by said tubular wall portion for stopping the movement of said mass from said discharge port into said container before the mouth of said container is intersected by the horizontal plane of said discharge port including a downwardly-extending, vertically reciprocable weight for contacting the surface of the mass within the container.

4. In combination with apparatus for separating entrained undesired products comprising air and moisture from a mass of flowable minute particles of substantially incompressible material and introducing the undesired products-free mass into an upwardly-opening container, said apparatus including an upwardly-extending tubular wall portion for receiving said mass and provided with a downwardly-opening discharge port at the lower end part thereof, means for moving said mass through said tubular wall portion to said discharge port, and means for removing said undesired products from said mass while said mass is within said tubular wall portion; elevator means for positioning a container wtih said one end part of said tubular wall portion within said container and spaced closely above the bottom thereof and for moving said container vertically whereby the bottom thereof moves away from said discharge port; and feeler means carried partly by said tubular wall portion for stopping the movement of said mass from said discharge port into said container before the mouth of said container is intersected by the horizontal plane of said discharge port including a movable member for contacting the surface of the mass within said container.

5. The steps in the method of simultaneously separating, in a first confined zone, undesirable products, consisting of air and moisture, from a mass of flowable minute particles of substantially incompressible material and introducing the undesirable products-free mass into a second confined zone, which comprise flowing said mass through said first confined zone and out of said first confined zone while removing said undesired products and while a portion of said first confined zone is within a portion of said second confined zone and while said portion of said second confined zone is gradually moving through and away from said first confined zone, whereby the surface of said mass moves toward the mouth of said second confined zone; feeling said surfaces as it moves toward said mouth; stopping the movement of said portion of said second confined zone when the top surface of said mass is adjacent the mouth of said second confined zone; and stopping the flow of said mass into said second confined zone upon feeling said top surface when said top surface is located adjacent said mouth.

References Cited in the file of this patent

UNITED STATES PATENTS

| | | |
|---|---|---|
| 359,951 | Alfree | Mar. 22, 1887 |
| 1,151,970 | Seamans | Aug. 31, 1915 |
| 2,073,432 | Von Segebaden et al. | Mar. 9, 1937 |
| 2,142,990 | Belcher | Jan. 10, 1939 |
| 2,258,631 | Sowden | Oct. 14, 1941 |
| 2,381,454 | Huth | Aug. 7, 1945 |
| 2,488,395 | Goldberg | Nov. 15, 1949 |
| 2,898,954 | Freeman | Aug. 11, 1959 |